(12) United States Patent
Saiki et al.

(10) Patent No.: US 9,963,008 B2
(45) Date of Patent: May 8, 2018

(54) STABILIZER-BAR HOLDING DEVICE

(71) Applicant: TOYOTA JIDOSHA KABUSHIKI KAISHA, Toyota-shi, Aichi-ken (JP)

(72) Inventors: Yuma Saiki, Toyota (JP); Satoshi Uchida, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days. days.

(21) Appl. No.: 15/281,658

(22) Filed: Sep. 30, 2016

(65) Prior Publication Data
US 2017/0151853 A1 Jun. 1, 2017

(30) Foreign Application Priority Data

Nov. 30, 2015 (JP) .................................. 2015-232946

(51) Int. Cl.
*B60G 21/055* (2006.01)

(52) U.S. Cl.
CPC .. *B60G 21/0551* (2013.01); *B60G 2204/1222* (2013.01); *B60G 2204/1224* (2013.01); *B60G 2204/41* (2013.01); *B60G 2206/427* (2013.01)

(58) Field of Classification Search
CPC ........ B60G 21/0551; B60G 2204/1222; B60G 2204/1224; B60G 2204/41; B60G 2206/427; B60G 2202/135
See application file for complete search history.

(56) References Cited

U.S. PATENT DOCUMENTS

| | | | | |
|---|---|---|---|---|
| 6,889,988 B2 * | 5/2005 | Cai | ..................... | B60G 21/0551 267/293 |
| 7,380,775 B2 * | 6/2008 | Niwa | ................. | B60G 21/0551 267/293 |
| 8,292,312 B2 * | 10/2012 | Kato | .................. | B60G 21/0551 267/141.1 |
| 8,424,891 B2 | 4/2013 | Nagai et al. | | |
| 2016/0257178 A1 * | 9/2016 | Higuchi | .................. | F16F 15/08 |
| 2016/0303939 A1 * | 10/2016 | Tsukamoto | ........ | B60G 21/0551 |

FOREIGN PATENT DOCUMENTS

| | | |
|---|---|---|
| JP | S62-091708 U | 6/1987 |
| JP | H01-176509 U | 12/1989 |
| JP | H04-103424 A | 4/1992 |
| JP | H11-192828 A | 7/1999 |
| JP | 2001-260624 A | 9/2001 |
| JP | 2007127239 A * | 5/2007 |
| JP | 2007261538 A * | 10/2007 |
| JP | 2008213751 A * | 9/2008 |
| JP | 2012-240592 A | 12/2012 |
| JP | 2015-112887 A | 6/2015 |

* cited by examiner

*Primary Examiner* — Laura Freedman
(74) *Attorney, Agent, or Firm* — Oliff PLC

(57) ABSTRACT

A stabilizer-bar holding device includes a bracket and a body for a vehicle, which hold a stabilizer bar. A normal line that is normal to each of a pair of mounted surfaces of a pair of mounted portions of the body is inclined with respect to an up and down direction of the vehicle. A holding surface of a holder of the body has a first holding surface that is a flat surface greater than each of the pair of mounted surfaces in angle of inclination with respect to the up and down direction. An up and down plane extending in the up and down direction through a central axis of the stabilizer bar extends through the first holding surface in a state in which the stabilizer bar is held by the stabilizer-bar holding device.

6 Claims, 5 Drawing Sheets

$\theta_1 < 90°$

STABILIZER-BAR HOLDING DEVICE

CROSS REFERENCE TO RELATED APPLICATION

The present application claims priority from Japanese Patent Application No. 2015-232946, which was filed on Nov. 30, 2015, the disclosure of which is herein incorporated by reference in its entirety.

BACKGROUND

Technical Field

The following disclosure relates to a stabilizer-bar holding device configured to hold a stabilizer bar.

Description of the Related Art

Patent Document 1 (Japanese Patent Application Publication No. 2012-240592) discloses a bar holding device constructed such that a stabilizer bar is held by a mounted surface of a body using a pair of brackets. A normal line that is normal to the mounted surface is inclined with respect to the up and down direction. The body has no holding surface contactable with a bushing. Patent Document 2 (Japanese Patent Application Publication No. 11-192828) discloses a bar holding device including a body provided such that a normal line that is normal to a mounted surface of the body extends in the up and down direction. This bar holding device includes a bracket having a recessed portion and a pair of mount portions provided on opposite sides of the recessed portion. Mount surfaces of the pair of mount portions are offset from each other, but the pair of mounted surfaces of the body are flush with each other. Patent Document 3 (Japanese Patent Application Publication No. 2001-260624) discloses a bar holding device including two bushings, one of which is provided inside the other. The inner bushing has a polygonal shape. In this bar holding device, however, the cross section formed by a body and a bracket does not have a polygonal shape.

SUMMARY

Accordingly, an aspect of the disclosure relates to improvement of a bar holding device including a bracket and a body for holding a stabilizer bar, for example, to improvement of durability of the bracket.

A bar holding device according to one aspect of the disclosure is configured such that a stabilizer bar is held by a bracket and a body. The body includes: a pair of mounted portions respectively having a pair of mounted surfaces; and a holder having a holding surface that is greater than each of the pair of mounted surfaces in angle of inclination with respect to an up and down direction. An up and down plane extending in the up and down direction through a central axis of the stabilizer bar extends through the holding surface in a state in which the stabilizer bar is held by the stabilizer-bar holding device. The holder of the body which has the holding surface receives at least a portion of a force acting on the stabilizer bar in the up and down direction. Thus, even in a construction in which a normal line that is normal to the mounted surface is inclined with respect to the up and down direction, the present bar holding device can reduce a force acting on the bracket in the up and down direction, resulting in improved durability of the bracket.

BRIEF DESCRIPTION OF THE DRAWINGS

The objects, features, advantages, and technical and industrial significance of the present disclosure will be better understood by reading the following detailed description of the embodiments, when considered in connection with the accompanying drawings, in which.

DETAILED DESCRIPTION OF THE EMBODIMENTS

First Embodiment

Figure 1:
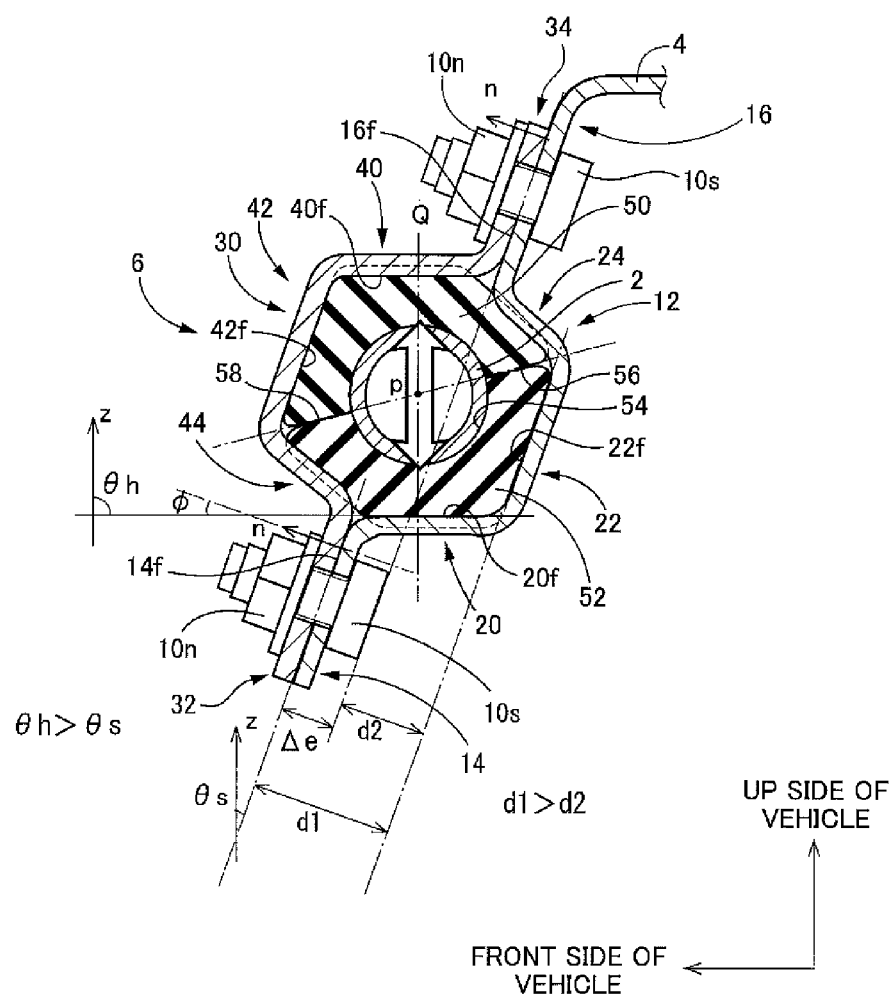
FIG. 1 is a cross-sectional view of a bar holding device according to a first embodiment.
Figure 2:
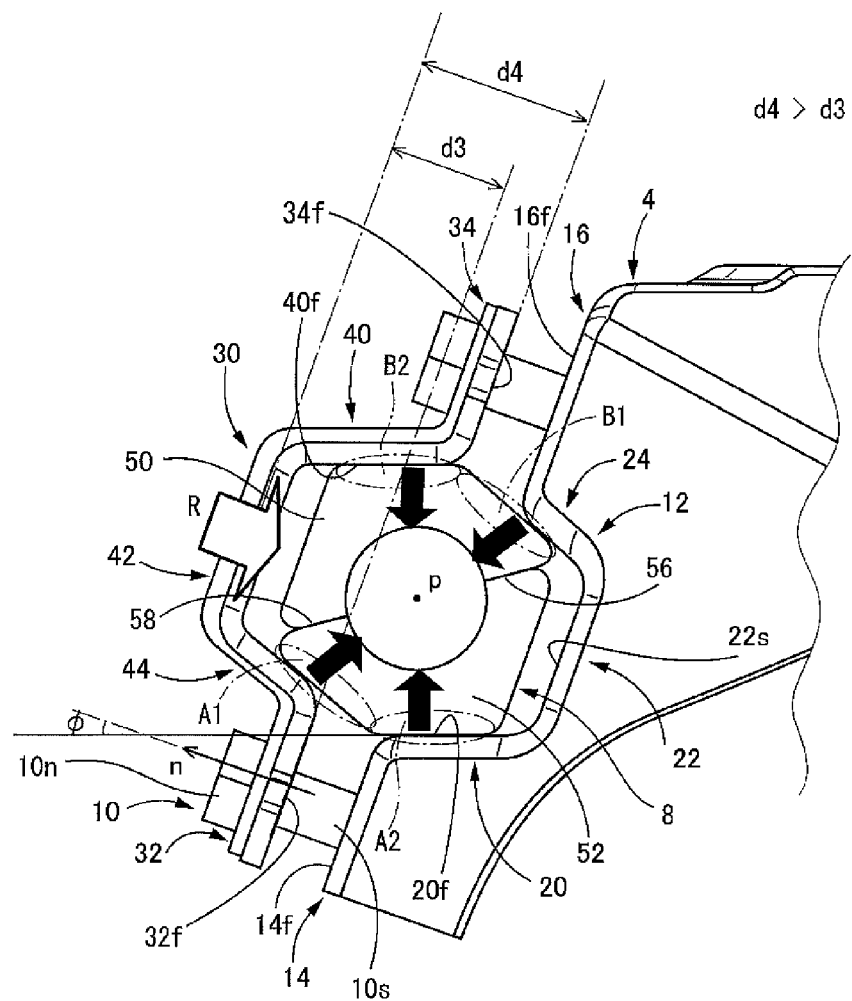
FIG. 2 is a front elevational view illustrating a state in which a stabilizer bar is held by a bracket and a body of the bar holding device, with a bushing interposed between the stabilizer bar, and the bracket and the body.
Figure 3:
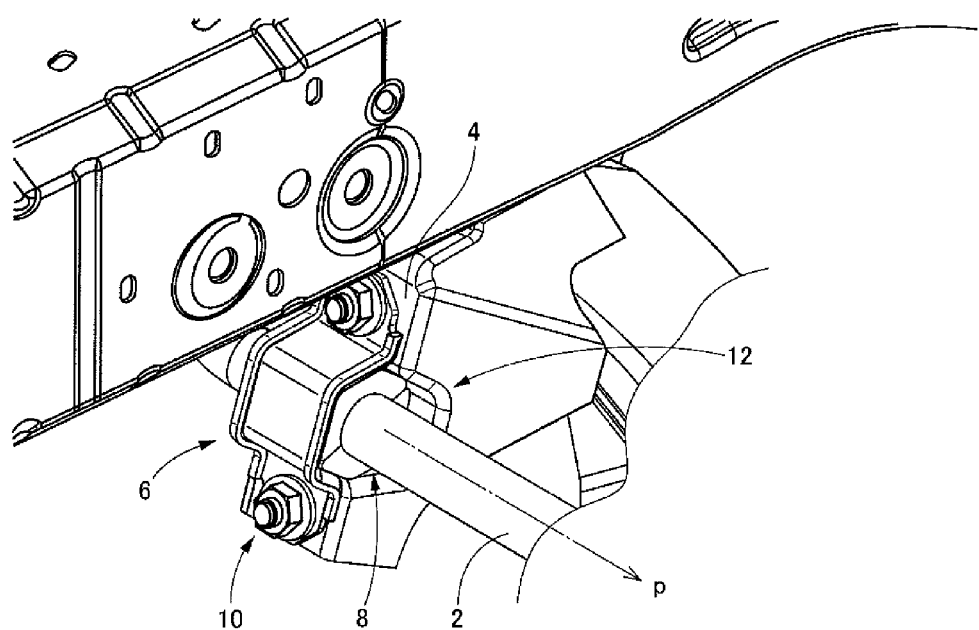
FIG. 3 is a perspective view of the bar holding device.
Figure 4A:
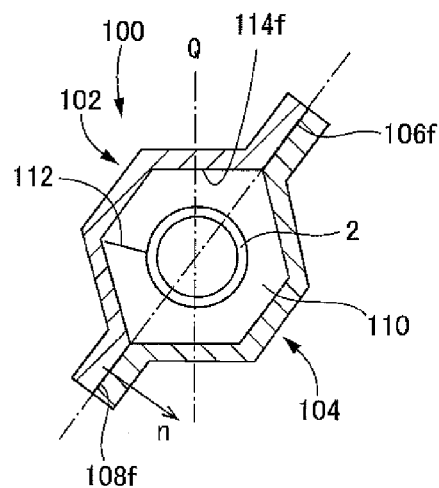
FIG. 4A is a cross-sectional view of a bar holding device according to another embodiment.
Figure 4B:
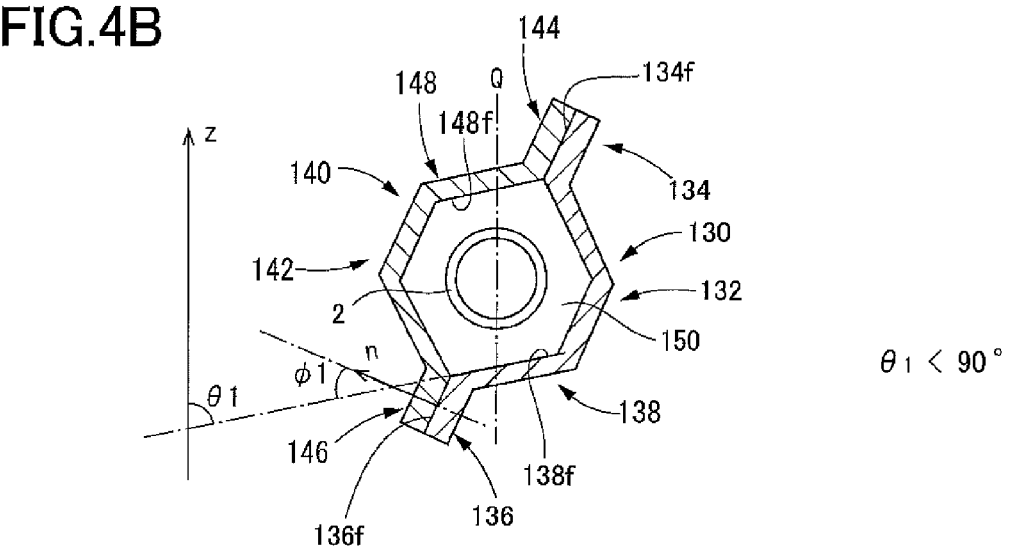
FIG. 4B is a cross-sectional view of a bar holding device according to still another embodiment.

Hereinafter, there will be described a stabilizer-bar holding device according to a first embodiment by reference to the drawings. As illustrated in FIG. 3, the stabilizer-bar holding device (hereinafter may be simply referred to as "bar holding device") holds a stabilizer bar 2 and includes a body 4, a bracket 6, a bushing 8, and a fastening device 10. When the bracket 6 holding the stabilizer bar 2 is mounted on the body 4 by the fastening device 10, the stabilizer bar 2 is held at its torsion bar portion. As illustrated in FIGS. 1 and 2, the fastening device 10 includes: stud bolts 10s mounted on the body 4; and nuts 10n. A direction parallel with a central axis p of the torsion bar portion of the stabilizer bar 2 is defined as an x direction. The up and down direction of a vehicle is defined as a z direction. A direction perpendicular to the directions x, z is defined as a y direction. In the present embodiment, the x direction coincides with the widthwise direction (right and left direction) of the vehicle, and the y direction coincides with the longitudinal direction (front and rear direction) of the vehicle.

The body 4 is shaped like a plate and formed with a holder 12 shaped like a recess. The body 4 has a pair of mounted portions 14, 16 respectively located on opposite sides of the holder 12. The pair of mounted portions 14, 16 respectively have mounted surfaces 14f, 16f. A normal line n that is normal to each of the mounted surfaces 14f, 16f is inclined with respect to the up and down direction z of the vehicle. In other words, the pair of mounted surfaces 14f, 16f are parallel with each other and inclined with respect to the x-y plane. As illustrated in FIG. 1, the holder 12 includes: a first holder 20 having a flat first holding surface 20f inclined with respect to each of the normal line n and the mounted surfaces 14f, 16f; a first facing portion 22 having a flat first facing surface 22f substantially parallel with the mounted surfaces 14f, 16f; and a connecting portion 24 located between the first facing portion 22 and the mounted portion 16. In the present embodiment, the angle θh of inclination of the first holding surface 20f with respect to the up and down direction z is greater than the angle θs of inclination of each of the mounted surfaces 14f, 16f with respect to the up and down direction z (θh>θs). In other words, the body 4 has a surface with a greater inclination angle with respect to the up and down direction z than that of each of the mounted surfaces 14f, 16f, thereby forming a depression serving as the holder 12. It is noted that the first holding surface 20f is substantially perpendicular to the up and down direction z in the present embodiment, but the present disclosure is not limited to this construction. For example, the angle of inclination of the first holding surface 20f with respect to the up and down direction z may be made between 70° and 110°. As will be described below, an up and down plane Q extends in the up and down direction through the central axis p of the stabilizer bar 2. In the state in which the stabilizer bar 2 is held by the stabilizer-bar holding device, the first holding surface 20f is provided in a state in which the up and down plane Q extends through the first holding surface 20f.

The mounted surface 14f and the mounted surface 16f are not located on the same plane but are offset from each other by an offset amount Δe. For example, by making a distance d1 between the mounted surface 14f and the first facing surface 22f greater than a distance d2 between the mounted surface 16f and the first facing surface 22f, it is possible to increase the area of the first holding surface 20f and reduce a distance from the mounted surface 16f to the first facing surface 22f. In other words, it is possible to easily work the body 4 while holding the stabilizer bar 2 well. It is noted that the offset amount Δe is not limited in particular.

As illustrated in FIGS. 1 and 2, the bracket 6 includes: a bushing holder 30 serving as a recessed portion for holding the bushing 8; and flat mount portions 32, 34 located on opposite sides of the bushing holder 30. In the state in which the bracket 6 is mounted on the body 4, the bushing holder 30 includes: a second holder 40 having a flat second holding surface 40f parallel with the first holding surface 20f of the body 4; a second facing portion 42 having a second facing surface 42f facing and parallel with the first facing surface 22f; and a connecting portion 44 connecting between the second facing portion 42 and the mount portion 32. Like the body 4, the mount portions 32, 34 are offset from each other. The mount portions 32, 34 of the bracket 6 respectively correspond to the mounted portions 14, 16 of the body 4. Thus, a distance d3 between a mount surface 32f of the mount portion 32 and the second facing surface 42f is less than a distance d4 between a mount surface 34f of the mount portion 34 and the second facing surface 42f (d3<d4). It is noted that the mount portions 32, 34 respectively have mounting holes through which the respective stud bolts 10s are inserted.

As illustrated in FIG. 1, the cross section formed by the bracket 6 and the body 4 and perpendicular to the central axis p of the stabilizer bar 2 has a generally hexagon shape which has six sides respectively constituted by the first holder 20, the first facing portion 22, the connecting portion 24, the second holder 40, the second facing portion 42, and the connecting portion 44. That is, the first holder 20 and the second holder 40 are opposed to and parallel with each other, the first facing portion 22 and the second facing portion 42 are opposed to and parallel with each other, and the connecting portions 24, 44 are opposed to each other.

The bushing 8 is held by the bracket 6 and the body 4 and includes two partial bushings 50, 52. In a state in which the two partial bushings 50, 52 are joined, the cross section of the bushing 8 which is perpendicular to the central axis p has a generally hexagon shape. A central portion of the bushing 8 has a through hole 54 extending parallel with the central axis p. The stabilizer bar 2 is held in the through hole 54. As illustrated in FIGS. 1 and 2, the bushing 8 is separated into the two partial bushings 50, 52 by separation surfaces 56, 58 each extending in the diameter direction of the through hole 54 and passing through corner portions of outer surfaces of the respective partial bushings 50, 52. In the state in which the bushing 8 is held by the bracket 6 and the body 4, the separation surfaces 56, 58 are located between (i) a corner portion of the body 4 between the first facing portion 22 and the connecting portion 24 and (ii) a corner portion of the bracket 6 between the second facing portion 42 and the connecting portion 44. The partial bushing 52 has: a portion A1 opposed to the connecting portion 44 of the bracket 6; and a portion A2 opposed to the first holder 20 of the body 4. The partial bushing 50 has: a portion B1 opposed to the connecting portion 24 of the body 4; and a portion B2 opposed to the second holder 40 of the bracket 6. Interference is provided for each of the portions A1, A2, B1, B2.

In the case where the stabilizer bar 2 is retained by the bracket 6 and the body 4 of the bar holding device constructed as described above, as illustrated in FIG. 2, the stabilizer bar 2 and the bushing 8 are inserted into a space defined by the bushing holder (recessed portion) 30 of the bracket 6 and the holder 12 of the body 4 in a direction parallel with the normal line n (which may be hereinafter referred to as "insertion direction R") in a state in which an outer circumferential portion of the stabilizer bar 2 is surrounded with the bushing 8. In this case, the first holding surface 20f and the second holding surface 40f facing and parallel with each other are inclined with respect to the insertion direction R (parallel with the normal line n) at an inclination angle ø. Thus, the portions A2, B2 of the bushing 8 which are respectively opposed to the first holding surface 20f and the second holding surface 40f can be compressed in the up and down direction (perpendicular to the first holding surface 20f and the second holding surface 40f) due to effects of the inclined surfaces (wedge effect) during the insertion. This compression applies a preload to the bushing 8 in the up and down direction. This construction increases the strength of supporting the stabilizer bar 2, without increase in size of the bushing 8. Likewise, the portions A1, B1 of the bushing 8 are compressed by the connecting portion 24 of the body 4 and the connecting portion 44 of the bracket 6, so that a preload is also applied to the bushing 8 in a direction inclined with respect to the up and down direction. In conventional bar holding devices, in contrast, a preload is applied in most cases to the bushing in a direction parallel to a mounting direction, making it difficult to apply the preload to the bushing in a direction intersecting the mounting direction. In the present embodiment, the body 4 and the bracket 6 respectively have the flat first holding surface 20f and the flat second holding surface 40f each inclined with respect to the insertion direction R. The first holding surface 20f and the second holding surface 40f are substantially perpendicular to the up and down direction. This construction makes it possible to apply a preload to the bushing 8 in the up and down direction intersecting the insertion direction R. Also, the first facing portion 22 and the second facing portion 42 are provided parallel with the mounted surfaces 14f, 16f. This construction allows the second facing portion 42 to be pressed in the insertion direction R toward the mounted surfaces 14f, 16f, allowing the bushing 8 holding the stabilizer bar 2 to be well inserted into the space defined by the holder 12 of the body 4 and the bushing holder 30 of the bracket 6.

The nuts 10n are engaged with the respective stud bolts 10s in the state in which the mount surfaces 32f, 34f of the bracket 6 are in contact with the respective mounted surfaces 14f, 16f of the body 4, and the stud bolts 10s mounted on the body 4 are inserted in the respective mount portions 32, 34 of the bracket 6, whereby the bracket 6 is mounted on the body 4. Consequently, the stabilizer bar 2 is held by the bracket 6 and the body 4, with the bushing 8 interposed between (i) the stabilizer bar 2 and (ii) the bracket 6 and the body 4. The bushing 8 is in contact with the first holding surface 20f and the first facing surface 221 of the body 4, and the stabilizer bar 2 is held by the body 4, with the bushing 8 interposed therebetween.

A larger thickness of the bracket could improve the durability of the bracket but would result in a larger weight and higher cost. Also, in conventional bar holding devices, in the case where a force applied to the stabilizer bar in the up and down direction acts on a curved portion of the bar between a mount portion and a bushing holder in the form of a recessed portion of the bracket, it is difficult to increase the strength of the bracket even if the thickness of the bracket is made larger. In the present embodiment, in contrast, the up and down plane Q extending in the up and down direction through the central axis p of the stabilizer bar 2 passes through the first holder 20 of the body 4 in the state in which the stabilizer bar 2 is held by the bar holding device. This construction allows the body 4 to well receive the force applied to the stabilizer bar 2 in the up and down direction, thereby reducing a force acting on the bracket 6 in the up and down direction, resulting in improved durability of the bracket 6. Also, the force applied to the stabilizer bar 2 in the up and down direction acts on the second holder 40 in the form of the flat portion of the bracket 6 and does not act on the curved portion. This construction further improves the durability of the bracket 6. Also, the preloads are applied to the portions of the bushing 8 over and under the stabilizer bar 2. This construction results in increase in stiffness of the bushing 8 without increase in the size of the bushing. It is noted that, in the present embodiment, the width of the first holding surface 20f (i.e., the length of the first holding surface 20f in the y direction) is slightly smaller than the diameter of the stabilizer bar 2. The first holding surface 20f may have any width as long as the first holding surface 20f is capable of well receiving the force applied to the stabilizer bar 2 in the up and down direction. The width of the first holding surface 20f is preferably made greater than or equal to a half the diameter of the stabilizer bar 2.

Alternative Embodiments

The bar holding device may have constructions illustrated in FIGS. 4A-5B instead of the construction in the first embodiment, for example. The bar holding device illustrated in FIG. 4A includes: a body 100 formed with a holder 102 opening at a generally lower portion of the body 100; and a bracket 104. The stabilizer bar 2 is held by the holder 102 and the bracket 104. It is not essential that mounted surfaces 106f, 108f of the body 100 are offset from each other. The mounted surfaces 106f, 108f may be provided on the same plane. Also, it is not essential that a bushing 110 has two partial bushings. The bushing 110 may have a single separation surface 112. In a state in which the stabilizer bar 2 is held, the up and down plane Q of the stabilizer bar 2 extends through a first holding surface 114f of the holder 102 which is substantially perpendicular to the up and down direction. A bar holding device illustrated in FIG. 4B is constructed such that a body 130 includes a holder 132 and the mounted portions 134, 136. The angle θ1 of inclination of a first holding surface 138f of a first holder 138 of the holder 132 with respect to the up and down direction z is less than 90° (θ1<90°). A bracket 140 includes a recessed portion in the form of a bushing holder 142 and mount portions 144, 146. A second holder 148 of the bushing holder 142 has a second holding surface 148f parallel with the first holding surface 138f in a state in which the bracket 140 is mounted on the body 130. In a state in which the stabilizer bar 2 is held by the body 130 and the bracket 140 with a bushing 150 between (i) the stabilizer bar 2 and (ii) the body 130 and the bracket 140, the up and down plane Q of the stabilizer bar 2 extends through the first holder 138 and the second holder 148. Thus, it is not essential that the first holding surface 138f is provided so as to be perpendicular to the up and down direction. Even in the case where the first holding surface 138f is not perpendicular to the up and down direction, the first holding surface 138f well receives the force applied to the stabilizer bar 2 in the up and down direction. Since the first holding surface 138f is inclined (at the inclination angle ϕ1) with respect to a normal line n that is normal to each of the mounted surfaces 134f, 136f of the respective mounted portions 134, 136 (with respect to the insertion direction), a preload in the up and down direction can be applied to the bushing 150 well.

Figure 5A:
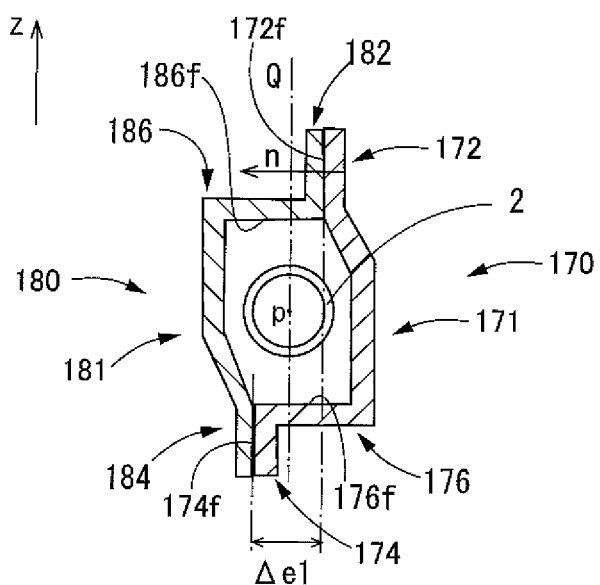
FIG. 5A is a cross-sectional view of a bar holding device according to still another embodiment.

The bar holding device illustrated in FIG. 5A is constructed such that a body 170 includes a holder 171 and mounted portions 172, 174. A normal line n that is normal to each of the mounted surfaces 172f, 174f of the respective mounted portions 172, 174 extends in a direction substantially perpendicular to the up and down direction z. The mounted surfaces 172f, 174f are offset from each other by an amount Δe1. A first holding surface 176f of a first holder 176 of the holder 171 extends in the direction substantially perpendicular to the up and down direction z. A bracket 180 has a recessed portion 181 and mount portions 182, 184. The recessed portion 181 includes a second holder 186 having a second holding surface 186f that faces the first holding surface 176f. Also in the present embodiment, the up and down plane Q of the stabilizer bar 2 extends through the first holder 176 and the second holder 186 in the state in which the stabilizer bar 2 is held.

Figure 5B:
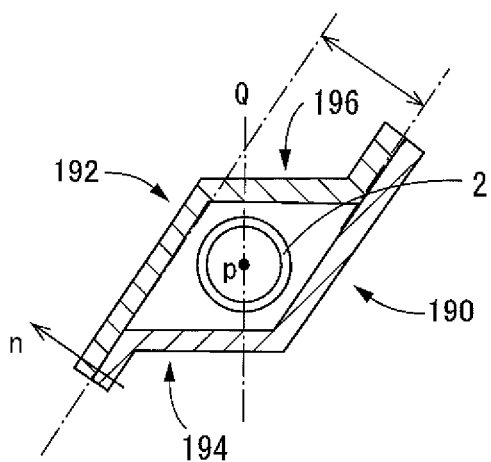
FIG. 5B is a cross-sectional view of a bar holding device according to still another embodiment.

A bar holding device illustrated in FIG. 5B is constructed such that the cross section formed by a body 190 and a bracket 192 and perpendicular to the central axis p of the stabilizer bar 2 has a quadrangle shape. Also in the present embodiment, the up and down plane Q of the stabilizer bar 2 extends through a first holder 194 of the body 190 and a second holder 196 of the bracket 192.

While the embodiments have been described above, it is to be understood that the disclosure is not limited to the details of the illustrated embodiments, but may be embodied with various changes and modifications, which may occur to those skilled in the art, without departing from the spirit and scope of the disclosure.

Claimable Inventions (1) A stabilizer-bar holding device, comprising:
a bracket comprising a recessed portion and a pair of mount portions respectively located on opposite sides of the recessed portion; and
a body for a vehicle, the body comprising (i) a pair of mounted portions respectively corresponding to the pair of mount portions of the bracket and (ii) a holder located between the pair of mounted portions and comprising a holding surface contactable with a bushing,
wherein a stabilizer bar is held by the bracket and the body with the bushing interposed between (a) the stabilizer bar and (b) the bracket and the body in a state in which the pair of mount portions of the bracket and the pair of mounted portions of the body are respectively fastened to each other by a fastening device, with the pair of mount portions of the bracket and the pair of mounted portions of the body being respectively in contact with each other, wherein a normal line that is normal to each of a pair of mounted surfaces of the pair of mounted portions is inclined with respect to an up and down direction of the vehicle, wherein the holding surface of the body comprises a first holding surface that is a flat surface greater than each of the pair of mounted surfaces in angle of inclination with respect to the up and down direction of the vehicle, and wherein an up and down plane extending in the up and down direction through a central axis of the stabilizer bar extends through the first holding surface in a state in which the stabilizer bar is held by the stabilizer-bar holding device.

The normal line that is normal to the mounted surface of the body only has to be inclined with respect to the up and down direction and may extend in the horizontal direction.

(2) The stabilizer-bar holding device according to the above form (1), the first holding surface is a flat surface perpendicular to the up and down direction.

The first holding surface is a flat surface substantially perpendicular to the up and down direction. The first holding surface is not limited to a surface completely perpendicular to the up and down direction and may be inclined with respect to a plane perpendicular to the up and down direction by a small amount. For example, the angle of inclination of the first holding surface with respect to the up and down direction is preferably determined between 70° and 110°. The angle is more preferably determined to an angle greater than or equal to 80° or 85° and less than or equal to 100° or 95°.

(3) The stabilizer-bar holding device according to the above form (1) or (2), wherein the pair of mounted surfaces of the body are provided so as not to be flush with each other.

The pair of mounted surfaces may or may not be offset from each other, but the offset mounted surfaces make it to perform working in the case where a depression is formed in the body.

(4) The stabilizer-bar holding device according to any one of the above forms (1) through (3), wherein the holder is located between the pair of mounted portions in a direction parallel with at least one of the pair of mounted surfaces.

(5) The stabilizer-bar holding device according to any one of the above forms (1) through (4), wherein a cross section formed by the body and the bracket and perpendicular to the central axis of the stabilizer bar has a substantially polygonal shape in the state in which the stabilizer bar is held by the stabilizer-bar holding device.

In the case where the polygonal shape is formed by the bracket and the body, each of a surface of the recessed portion of the bracket and a surface of the holder of the body is flat. This construction can well receive a force acting on the stabilizer bar in the up and down direction. The shape formed by the body and the bracket may be any of a triangle, a quadrangle, a pentagon, a hexagon, and so on, but is preferably a polygonal shape having four or more sides. In the case where a polygonal shape having an even number of sides, sides constituting the bracket and sides constituting the body may be respectively face and parallel with each other.

(6) The stabilizer-bar holding device according to any one of the above forms (1) through (5), wherein the first holding surface extends in a direction intersecting the normal line, and wherein the recessed portion of the bracket comprises a second holder comprising a second holding surface parallel with the first holding surface.

The bracket and the bushing are in most cases mounted so as to be pressed on the body in a direction parallel with the normal line. In contrast, the first holding surface and the second holding surface are substantially parallel with each other and extend in a direction intersecting the normal line. Thus, during mounting of the bracket and the bushing on the body, an effect of inclined surface allows the bushing to be compressed in a direction perpendicular to the first holding surface and the second holding surface, i.e., in the up and down direction.

(7) The stabilizer-bar holding device according to the above form (6), wherein the substantially polygonal shape comprises a plurality of sides comprising a pair of sides opposed to each other, and the pair of sides opposed to each other are respectively constituted by the first holding surface and the second holding surface.

(8) The stabilizer-bar holding device according to the above form (7), wherein interference is provided for each of a portion of the bushing which is opposed to the first holding surface and a portion of the bushing which is opposed to the second holding surface.

(9) The stabilizer-bar holding device according to any one of the above forms (1) through (8), wherein the bushing comprises a plurality of partial bushings, and wherein the bushing is separated into the plurality of partial bushings by a plurality of separation surfaces, at least one of which is not opposed to the first holding surface.

The bushing including the plurality of partial bushings allows easy mounting of the bushing.

(10) A stabilizer-bar holding device, comprising:

a bracket comprising a recessed portion and a pair of mount portions respectively located on opposite sides of the recessed portion; and a body for a vehicle, the body comprising (i) a pair of mounted portions respectively corresponding to the pair of mount portions of the bracket and (ii) a holder that is a depression located between the pair of mounted portions and comprising a holding surface contactable with a bushing, wherein a stabilizer bar is held by the bracket and the body with the bushing interposed between (a) the stabilizer bar and (b) the bracket and the body in a state in which the pair of mount portions of the bracket and the pair of mounted portions of the body are respectively fastened to each other by a fastening device, with the pair of mount portions of the bracket and the pair of mounted portions of the body being respectively in contact with each other, and with a normal line that is normal to each of the pair of mounted surfaces of the body being inclined with respect to an up and down direction of the vehicle.

The stabilizer-bar holding device according to this form may incorporate the technical feature according to any one of the above forms (1) through (9).

(11) The stabilizer-bar holding device according to the above form (10), wherein the bushing is constituted by a plurality of partial bushings.

What is claimed is:

1. A stabilizer-bar holding device, comprising:
   a bracket comprising a recessed portion and a pair of mount portions respectively located on opposite sides of the recessed portion; and
   a body for a vehicle, the body comprising (i) a holder comprising a holding surface contactable with a bushing and (ii) a pair of mounted portions respectively located on opposite sides of the holder, the pair of mounted portions respectively corresponding to the pair of mount portions of the bracket, wherein a stabilizer bar is held by the bracket and the body with the bushing interposed between (a) the stabilizer bar and (b) the bracket and the body in a state in which the pair of mount portions of the bracket and the pair of mounted portions of the body are respectively fastened to each other by a fastening device, with the pair of mount portions of the bracket and the pair of mounted portions of the body being respectively in contact with each other, wherein a normal line that is normal to each of a pair of mounted surfaces of the pair of mounted portions is inclined with respect to an up and down direction of the vehicle, wherein the holding surface of the body comprises a first holding surface that is a flat surface greater than each of the pair of mounted surfaces in angle of inclination with respect to the up and down direction of the vehicle, and wherein an up and down plane extending in the up and down direction through a central axis of the stabilizer bar extends through the first holding surface in a state in which the stabilizer bar is held by the stabilizer-bar holding device.

2. The stabilizer-bar holding device according to claim 1, wherein the first holding surface is a flat surface perpendicular to the up and down direction.

3. The stabilizer-bar holding device according to claim 1, wherein the pair of mounted surfaces of the body are provided so as not to be flush with each other.

4. The stabilizer-bar holding device according to claim 1, wherein a cross section formed by the body and the bracket and perpendicular to the central axis of the stabilizer bar has a substantially polygonal shape in the state in which the stabilizer bar is held by the stabilizer-bar holding device.

5. The stabilizer-bar holding device according to claim 1,
wherein the first holding surface extends in a direction intersecting the normal line, and
wherein the recessed portion of the bracket comprises a second holder comprising a second holding surface parallel with the first holding surface.

6. The stabilizer-bar holding device according to claim 1,
wherein the bushing comprises a plurality of partial bushings, and
wherein the bushing is separated into the plurality of partial bushings by a plurality of separation surfaces, at least one of which is not opposed to the first holding surface.

* * * * *